UNITED STATES PATENT OFFICE.

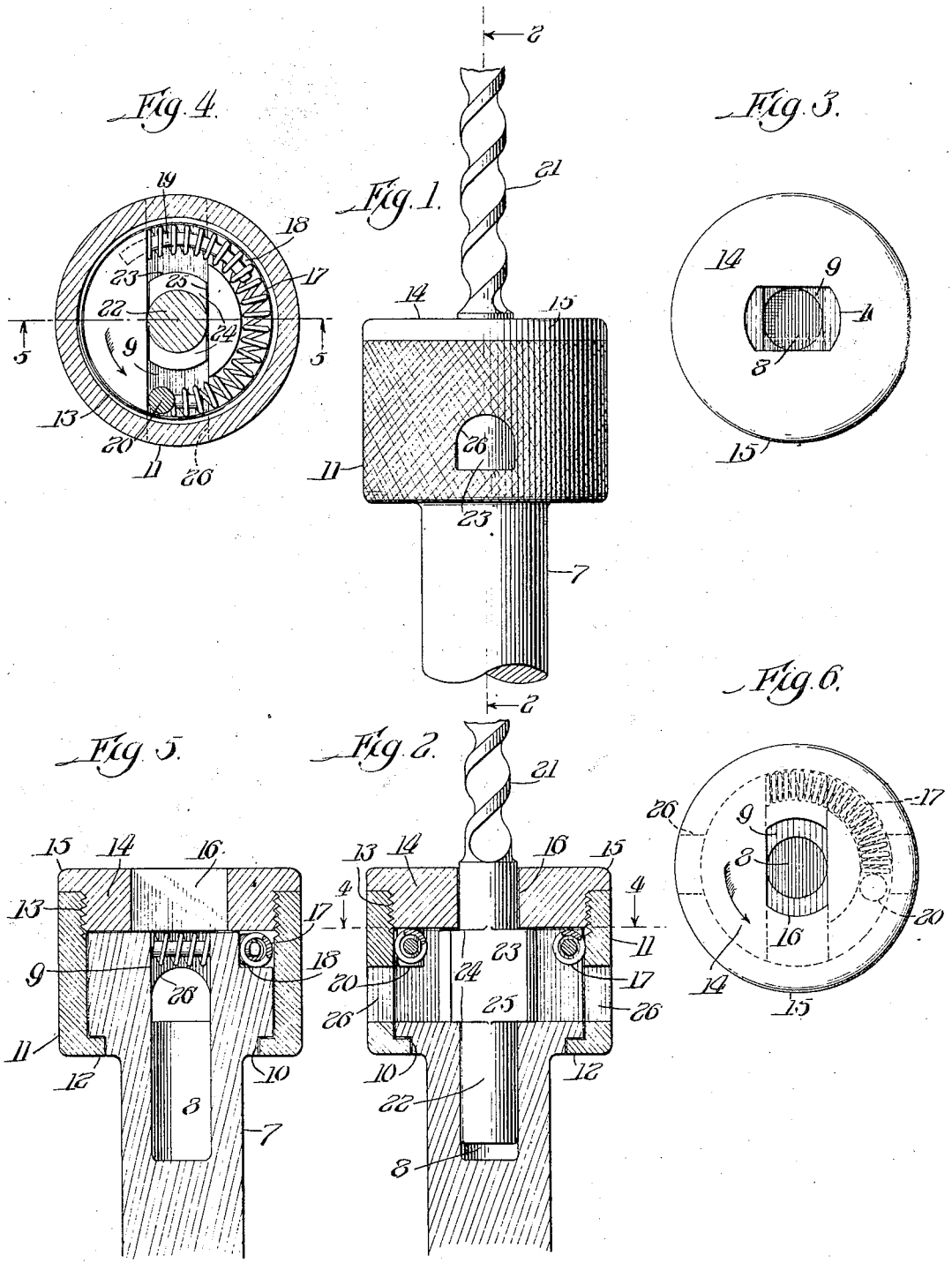

DANIEL W. EDWARDS, OF ROCKFORD, ILLINOIS, ASSIGNOR TO GREENLEE BROS. & COMPANY, OF ROCKFORD, ILLINOIS, A CORPORATION OF ILLINOIS.

CHUCK.

1,133,795.  Specification of Letters Patent.  Patented Mar. 30, 1915.

Application filed April 19, 1913. Serial No. 762,402.

*To all whom it may concern:*

Be it known that I, DANIEL W. EDWARDS, a citizen of the United States, residing at Rockford, in the county of Winnebago and State of Illinois, have invented certain new and useful Improvements in Chucks, of which the following is a specification.

This invention relates to chucks, more particularly to bit chucks as used with boring machines, and has for its object the construction of such a chuck whereby the bit may be placed in a working position therein, retained in such position during operation, and removed from the chuck without the use of any clamping means requiring auxiliary tools to adjust same, or set-screws, etc., as are commonly used in bit chucks of this type.

A further object is to provide said construction of chuck with means for holding the bit therein devoid of any movable or adjustable parts into and out of contact with the bit to hold same from rotation and in a working position; and in order to utilize such a means I employ a bit having a peculiar shaped shank which is the subject matter of a separate patent application.

In the accompanying drawings Figure 1 is a side elevational view of my improved bit chuck, with a bit. Fig. 2 is a sectional view taken on the line 2—2 of Fig. 1. Fig. 3 is a view looking at the face end of Fig. 1, the bit removed. Fig. 4 is a plan section on the line 4—4 Fig. 2. Fig. 5 is a longitudinal section on the line 5—5 of Fig. 4, the bit being removed. Fig. 6 is a plan view similar to Fig. 3 showing the chuck head turned to a position to allow a bit to be inserted.

The member 7 of the chuck is formed integral with the bit spindle of a boring machine and is therefore the driven member. The end of said spindle member is formed with an enlarged circular head having a central longitudinal bore 8 extending into the body of the spindle, the head being divided into two sections by the transverse slot 9 extending centrally therethrough, said bore and a portion of the slot forming a bit socket, and the head being formed at its shoulder end with an annular groove 10.

The chuck head 11 tubular in shape, fits rotatably about the spindle head, is held from movement in one direction by its internal shoulder 12 fitting into the annular groove 10 of the spindle-head, and is formed with an internally threaded end 13. A cap 14 is screwed into connection with the threaded end 13, said cap having a flange extension 15 which is adapted to fit with the end of chuck-head 11 when the cap is screwed up, this position retaining said chuck-head and cap in a rotatable connection with the spindle-head but being free from any longitudinal play in connection therewith. An elongated slot 16 is formed through cap 14, the slot being of approximately the same width as the diameter of bore 8, with its length extending beyond said width as is seen in Fig. 3.

A coiled spring 17 is carried by the spindle-head, semi-circularly disposed, a portion 18 of said head being cut away to retain the spring below the end of the head, and has one end held in position by the pin 19 and abutting the spindle-head, and its other end in connection with a depending lug 20 carried by the cap 14.

The direction of rotation of the spindle is as indicated in Fig. 4, and the driving connection between the spindle-head and chuck-head is through the contact of the depending lug 20 with said spindle-head.

When the spindle is at rest as seen in Fig. 3, the chuck-head may be oscillated as seen in Fig. 6, a quarter of a turn, against the action of spring 17, thus positioning slot 16 of the cap longitudinally in alinement with slot 9 of the spindle-head. In this position a bit may be inserted into the chuck and the form of bit 21 employed has a circular shank 22 formed with an enlargement 23 corresponding in cross-section with the shape of slot 16 and having its shoulders 24 contained within the height of the slot 9. With said bit inserted in the chuck, the end of shank 22 will be located in bore 8 to retain the bit in said bore to retain the bit in a concentric operative position, the parallel sides 25 of the enlarged portion 23 being confined against the sides of the slot 9 to hold the bit fixed rotatably with the spindle, and upon releasing said chuck-head the tensional force of spring 17 will move said chuck-head back to its working position, thereby locking the bit in position in the chuck, since the under faces of cap 14 adjacent the parallel sides of slot 16 will be positioned opposite the shoulders 24 at the bit end, thus retaining the bit from longitudinal movement in the chuck.

Openings 26 are provided in the chuck-head 11 opposite slot 9.

The chuck illustrated in the drawings is to be used for an upward feed, that is, where the work to be bored is carried overhead the chuck, and in this position shavings might work through the openings formed by the slot in the cap adjacent each side of the bit, down into the slot 9 from which they would be discharged through openings 26 by centrifugal force of the rotary spindle. When the chuck is inverted and disposed above the work, then these openings 26 would be unnecessary as there would be no reason for chips entering the chuck through said openings.

In the embodiment of chuck disclosed, a coiled spring is utilized to give a tensional force by which the chuck-head may be yieldingly moved to an inoperative position and returned by said force to its operative position, but it is evident that various types of springs may be used to accomplish this result. Furthermore variations in the size and shape of openings in the spindle and chuck-head may be made within the scope of appended claims without departing from essential features of the chuck, these features consisting of holding a bit concentric with the chuck, in a fixed relation therewith and fixed from longitudinal displacement, in coöperation with the novel features of inserting a bit into the chuck and removing it therefrom.

The qualities of a chuck of this description are readily apparent. It has great time and labor saving advantages over those chucks requiring auxiliary tools and wrenches to place and replace bits in a chuck, and while I am aware that chucks of this nature have previously been constructed, yet they are generally complicated in structure and have a complexity of working parts, thus rendering them expensive to manufacture and easily liable to get out of working order. Furthermore, a safe construction of chuck is resultant in my improved construction, as no movable members are employed that may extend beyond the peripheral surface of the chuck to become dangerous when the chuck is rotating should anything come in contact with said surface of the chuck.

I claim as my invention.

1. A chuck comprising a rotatable spindle member, a socket in the spindle member having a circular bore and an offset portion therefrom, the socket adapted to retain a tool shank therein with an offset on said shank located in the offset of the socket to hold said tool shank rotatable with the spindle member, an oscillatory cap inclosing the socket end of the spindle member and having a tool opening therein to allow said tool shank and offset to be passed therethrough, and yieldable means in connection with the cap to hold same in operative position whereby the cap will lock said tool shank through its offset portion from longitudinal displacement, the oscillation of said cap against the action of said yieldable means moving the cap to an inoperative position to aline said socket and cap end offset whereby a tool held in the socket may be removed therefrom.

2. A chuck comprising a rotatable spindle member having a tool socket with an offset in its tool receiving end an oscillatory end to the spindle member having a tool opening with an offset therein with the offset when the chuck is operative, positioned out of longitudinal alinement with said socket offset, a driving connection between the spindle member and end, and a yieldable connection between the spindle member and end whereby the end may be oscillated against said yieldable connection to bring said two offsets in longitudinal alinement.

3. A chuck, comprising a spindle-connected member having an axially disposed tool receiving socket at the outer end of which is a laterally extending recess, a head mounted to oscillate upon said member, having an axial opening therethrough shaped in cross-section to conform to that of said socket and recess, means for driving the head with the spindle-connected member when the recesses are out of axial alinement, and means for yieldingly resisting oscillatory movement of the head when the same is moved to aline its recess with that of the spindle-connected member.

4. A chuck comprising a spindle shank, a socket therein irregular in cross-section to retain against rotation a bit-shank having a portion thereof correspondingly irregular in cross-section, an end member at the entrance to the bit receiving end of said socket, movable rotatably on the spindle axis and having an irregular axially disposed bit opening therethrough corresponding in cross-section to the cross-section of said above-mentioned bit shank, and means for maintaining with a yielding force said end member with the transverse axis of its bit opening out of alinement with that of the spindle socket.

5. A chuck comprising a shank having an axial bore at the bit receiving end of the shank, a head rotatably mounted on the shank and having an end inclosing the said bit receiving end of the shank, the shank having a socket extending from its bore and being open at said open end of the bore, and said end having an elongated opening therethrough in alinement with said bore and being movable into and out of registration with said open end of the shank socket by rotary movement of the head upon the shank.

6. A chuck comprising a shank having a socket extending from the end of the shank into the body thereof with parallel opposite sides parallel to the shank axis and spaced on opposite sides thereof, an axial bore in the shank communicating with said socket, and a head mounted rotatably on the shank and having an end inclosing the socket end of the shank, said end having an axial socket therethrough defined by parallel opposite sides and being registerable and nonregisterable with the said shank socket sides through rotary movement of the head upon the shank.

7. A chuck comprising a shank having an axial bore open at one end of the shank and a socket extending inward from said end and having two spaced opposite sides tangent with the shank bore, a head mounted rotatably on the shank and having an end inclosing the said shank end, said head-end having an axial socket therethrough having two opposite sides in longitudinal alinement with the said shank socket sides, the said sides of the head-end socket being movable into and out of alinement with the shank socket sides by rotary movement of the head upon the shank.

8. A chuck comprising a shank having an axial bore open at one end of the shank and a socket extending inward from said end and having two spaced opposite parallel sides tangent with the shank bore, a head mounted rotatably on the shank and having an end inclosing the said shank end, said head-end having an axial socket therethrough in alinement with the said shank bore and having two opposite and parallel sides movable into and out of parallelism with the said parallel sides of the shank socket by rotary movement of the head upon the shank.

9. A chuck comprising a shank having an axial bore open at one end of the shank and an elongated socket extending inward from said end and diametrically across said bore, a head mounted rotatably upon the shank and having an end inclosing said shank end, the head-end having a socket therethrough shaped with diametrically oppositely extending socket portions movable into and out of registration with the diametrically extending portions of said shank socket by rotary movement of the head upon the shank.

10. A chuck comprising a shank having an axial bore open at one end of the shank, a member mounted opposite the said open socket and having an axial bore therethrough co-axial with the shank bore and shaped to extend radially from its axis, said shank end having a socket extending radially from its bore and having opposite sides spaced coincident with opposite sides of said member socket, and said member being operatively movable to aline and disaline its socket with that of the shank.

11. A chuck comprising a shank having an axial bore for receiving a bit-shank, a head mounted rotatably on the shank and having an end inclosing the bit receiving end of the shank, said head-end having a central opening therethrough shaped to receive and allow to pass fittingly therethrough a cylindrical bit-shank having a lateral extension intermediate its ends, the bit receiving end of the shank having a socket in its end to receive said bit lateral extension and hold the same fittingly against rotation, the lateral extension of the head-end opening being operatively movable into and out of registration with said shank socket by rotary movement of the head upon the shank.

In testimony whereof I have hereunto set my hand in presence of two subscribing witnesses.

DANIEL W. EDWARDS.

Witnesses:
E. BEHEL,
JOHN F. MCCANNA, Jr.